United States Patent
Tsai

(10) Patent No.: US 7,110,121 B2
(45) Date of Patent: Sep. 19, 2006

(54) ROTATION AND TRANSLATION MEASUREMENT

(75) Inventor: John C. Tsai, Saratoga, CA (US)

(73) Assignee: Excel Precision, Inc., Santa Clara, CA (US)

( * ) Notice: Subject to any disclaimer, the term of this patent is extended or adjusted under 35 U.S.C. 154(b) by 638 days.

(21) Appl. No.: 10/053,508

(22) Filed: Nov. 10, 2001

(65) Prior Publication Data

US 2002/0093663 A1 Jul. 18, 2002

Related U.S. Application Data

(63) Continuation-in-part of application No. 09/434,100, filed on Nov. 5, 1999, now Pat. No. 6,316,779, which is a continuation-in-part of application No. 08/812,998, filed on Mar. 4, 1997, now Pat. No. 5,991,112.

(51) Int. Cl.
*G01B 11/02* (2006.01)

(52) U.S. Cl. .................................. 356/498

(58) Field of Classification Search .............. 356/498, 356/491, 493, 499, 620, 622, 486, 487, 492, 356/496, 500
See application file for complete search history.

(56) References Cited

U.S. PATENT DOCUMENTS

| | | | | |
|---|---|---|---|---|
| 3,601,490 A | * | 8/1971 | Erickson | ...................... 356/493 |
| 3,738,754 A | * | 6/1973 | Marcy et al. | ................ 356/498 |
| 4,714,339 A | * | 12/1987 | Lau et al. | ................... 356/4.09 |
| 5,496,999 A | * | 3/1996 | Linker et al. | ............... 250/306 |
| 5,521,704 A | * | 5/1996 | Thiel et al. | .................. 356/486 |
| 5,610,686 A | * | 3/1997 | Osanai | ......................... 355/72 |
| 5,784,166 A | * | 7/1998 | Sogard | ........................ 356/509 |
| 5,812,266 A | * | 9/1998 | Hercher | ....................... 356/620 |
| 5,925,956 A | * | 7/1999 | Ohzeki | ....................... 310/90.5 |
| 6,316,779 B1 | * | 11/2001 | Tsai | ....................... 250/559.29 |

* cited by examiner

*Primary Examiner*—Gregory J Toatley, Jr.
*Assistant Examiner*—Michael A. Lyons
(74) *Attorney, Agent, or Firm*—Raymond E. Roberts; Intellectual Property Law Offices

(57) ABSTRACT

A position determining system (PDS)(100) or multiple parameters measurement system (MPMS)(300) particularly useful for translation and rotation measurement of objects having up to five degrees of freedom. A light source (122, 302) provides light beams (124, 304) into at least two channels. Each channel may include an interferometer (310), reflective target (110, 314), beam splitter (128, 312), detector (132, 316), and receiver (318). In concert, the detectors (132, 316) sense horizontal, vertical, and roll position and the receivers (318) sense longitudinal and yaw position change. Optionally, modulation can be imposed on the light beams (124, 304) and phase-sensitive synchronous demodulation used to enhance accuracy.

14 Claims, 8 Drawing Sheets

ROTATION AND TRANSLATION MEASUREMENT

CROSS-REFERENCE TO RELATED APPLICATIONS

This application is a continuation-in-part of U.S. application Ser. No. 09/434,100 filed Nov. 5, 1999, now U.S. Pat. No. 6,316,779 which is a continuation-in-part of U.S. application Ser. No. 08/812,998 filed Mar. 4, 1997, now U.S. Pat. No. 5,991,112 issued Nov. 23, 1999.

TECHNICAL FIELD

The present invention relates generally to the field of optical measurement, and more particularly to accurately detecting positional characteristics of a fixed or moving measurement target. It is anticipated that primary applications of the present invention will be in manufacturing of highly precise assemblies and in industrial and laboratory processes requiring high precision position detection and control.

BACKGROUND ART

Many present industries and fields of research are encountering a need for faster and more accurate position and movement determination. For example, in semiconductor fabrication and disk drive assembly the capacity of the ultimate end product depends highly on the accuracy of the measurement systems used, while the economy of the product often depends highly on the speed of the measurement systems used.

Many different measurement systems exist and are in wide use today. Of present interest are optical measurement systems, since they often permit non-contact measurement and have many other desirable characteristics. Present optical systems range from simple triangulation systems which use light beam reflection and geometric principles known since ancient times, to complex laser systems which use interferometric principles to achieve accuracy to within fractions of one light wavelength. However, particularly as modem applications become increasingly complex, the often conflicting goals of measurement accuracy and manufacturing speed remain ones where many seek further improvement.

FIG. 1 (background art) stylistically depicts a measurement system 10 for determining positional information about a movement stage 12. As FIG. 1 illustrates with linear and circular arrowed lines, the movement stage 12 can have its position defined with respect to numerous coordinate systems. For example, positional information about the movement stage 12 can be with respect to each of x, y, and z linear axes, as well as with respect to each of rotational axes for pitch, yaw, and roll. The movement stage 12 thus can be viewed as having as many as has six degrees of freedom. Of course, and as often is the case, movement may be limited to only some of or may not be of interest in only some of these degrees of freedom, but accurate and fast measurement is still often a daunting task.

FIG. 1 includes a first detector 14, a second detector 16, a third detector 18, a controller 20, and an external system 22. The first detector 14 can detect position relative to the x-axis, and provide positional information with respect to this to the controller 20. The second detector 16 can detect position or displacement relative to the y-axis, and provide further positional information about this to the controller 20.

The third detector 18 can detect position or displacement relative to the z-axis and provide information about this to the controller 20.

Practitioners of the optical measurement arts will recall that many common detectors today are only able to detect positional change. For example, interferometers can only detect target displacement, a relative position measurement, and not initial or absolute position. Further, if displacement occurs too slow or too fast even these techniques will fail. Herein we generally discuss absolute and relative measurement techniques collectively unless particular differences are important.

Returning to FIG. 1, the controller 20 there provides the positional information it receives, perhaps after appropriate processing and format conversion, to the external system 22. The external system 22 may simply be a display unit that a human user reads, or it may be a servo feedback system precisely controlling various movements of the movement stage 12 in a complex manufacturing process. The external system 22 is thus "external" with respect to the measurement process used; it is merely a recipient of and an ultimate user of the results of the measurement system for some higher purpose.

Unfortunately, the simple position determining system of FIG. 1 can only provide positional information about three degrees of freedom for the movement stage 12. It cannot, for example, tell us anything about roll as depicted by the rotational arrowed line 24. Using detectors of the sort depicted here, adding roll detection would require adding at least a fourth detector 26 (depicted in ghost form) in parallel with the second detector 16. Doing this would thus entail the expenses of more detector hardware, increased controller capability to handle the additional burden of this, and the attendant set-up and maintenance of the more complex position determining system which would result. If the detectors which are used are laser interferometers, as might very well be the case today in a manufacturing or laboratory scenario where high accuracy is necessary, the expense of another detector could be quite appreciable. The costs of additional set-up and maintenance would also likely be appreciable. However, and worth noting for later in this discussion, the added cost for increased controller capability might be quite negligible.

Accordingly, what is needed is a position determining system which employs relatively simple detection hardware yet provides positional information for a measurement target with respect to multiple axes.

DISCLOSURE OF INVENTION

Accordingly, it is an object of the present invention to provide a position determining system which provides information about a measurement target with respect to multiple axes or degrees of freedom.

Another object of the invention is to provide a position determining system which provides information on absolute or initial position, as contrasted with merely relative position based on measurement target displacement.

Another object of the invention is to provide a position determining system which concurrently provides both rotation and translation of positional information.

And, another object of the invention is to provide a position determining system which is fast in operation yet provides positional information which is highly accurate.

Briefly, one preferred embodiment of the present invention is a measuring apparatus. A light source produces light beams for at least two optical channels. In each optical channel, an interferometer is provided to receive one light beam and provide from it a reference beam and a measurement beam. A reflective target then receives and redirects the measurement beam. A beam splitter for receives the redirected measurement beam and provides from it a first and second portions. A detector for senses the first portion and produces a detector signal based on it. The interferometer further receives the second portion of the measurement beam and combines it with the reference beam to form a result beam. A receiver is senses the result beam and produces a receiver signal based on it.

An advantage of the present invention is that it provides highly desirable non-contact position determination, based on its use of optical principles. Further, due to its ability to employ lasers as a light source, the invention may be used for measurement targets ranging from small to quite large and at distances ranging from near to quite remote.

Another advantage of the invention is that it permits measurement of combinations of positional characteristics which have previously been difficult to attain with a limited component count. For example, using two parallel optical channels it can measure target translation or straightness in a perpendicular x-y plane as well as target roll in the x-y plane. The invention is thus effectively able to measure three axes or degrees of freedom with only two sensors. Still additional sensors can also be added to provide yet further capability Another advantage of the invention is that its speed of measurement is considerably less limited than is the case for relative type measurement systems. The invention can accurately measure position when a target is at rest, i.e., zero speed, and also when a target is moving quite slowly or decelerating toward or accelerating from rest. Thus, the present invention does not suffer from a "zero-barrier" limitation like conventional interferometer systems. The invention can also accurately measure position when a target is moving fast, i.e., has a high slew rate. In the present invention, the permissible target speed is limited merely by the sensor response times and the electronics used for signal processing, which can be quite. This is in marked contrast to conventional laser interferometer systems, which are today severely limited by the obtainable beam frequency differential.

And, another advantage of the invention is that it is economical to construct and operate, particularly in comparison with conventional systems producing similar accuracy and measurement speed such as laser interferometer based systems.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended drawings in which:

FIG. 9a–e depict various side elevation views of the face of the movement stage, in which: FIG. 9a is of an optimal initial set-up or starting arrangement, FIG. 9b is of the movement stage after rightward movement, FIG. 9c is of the movement stage after upward movement, FIG. 9d is of the movement stage after diagonal rightward-upward movement, and FIG. 9e is of the movement stage after counter-clockwise roll.

BEST MODE FOR CARRYING OUT THE INVENTION

Figure 1:
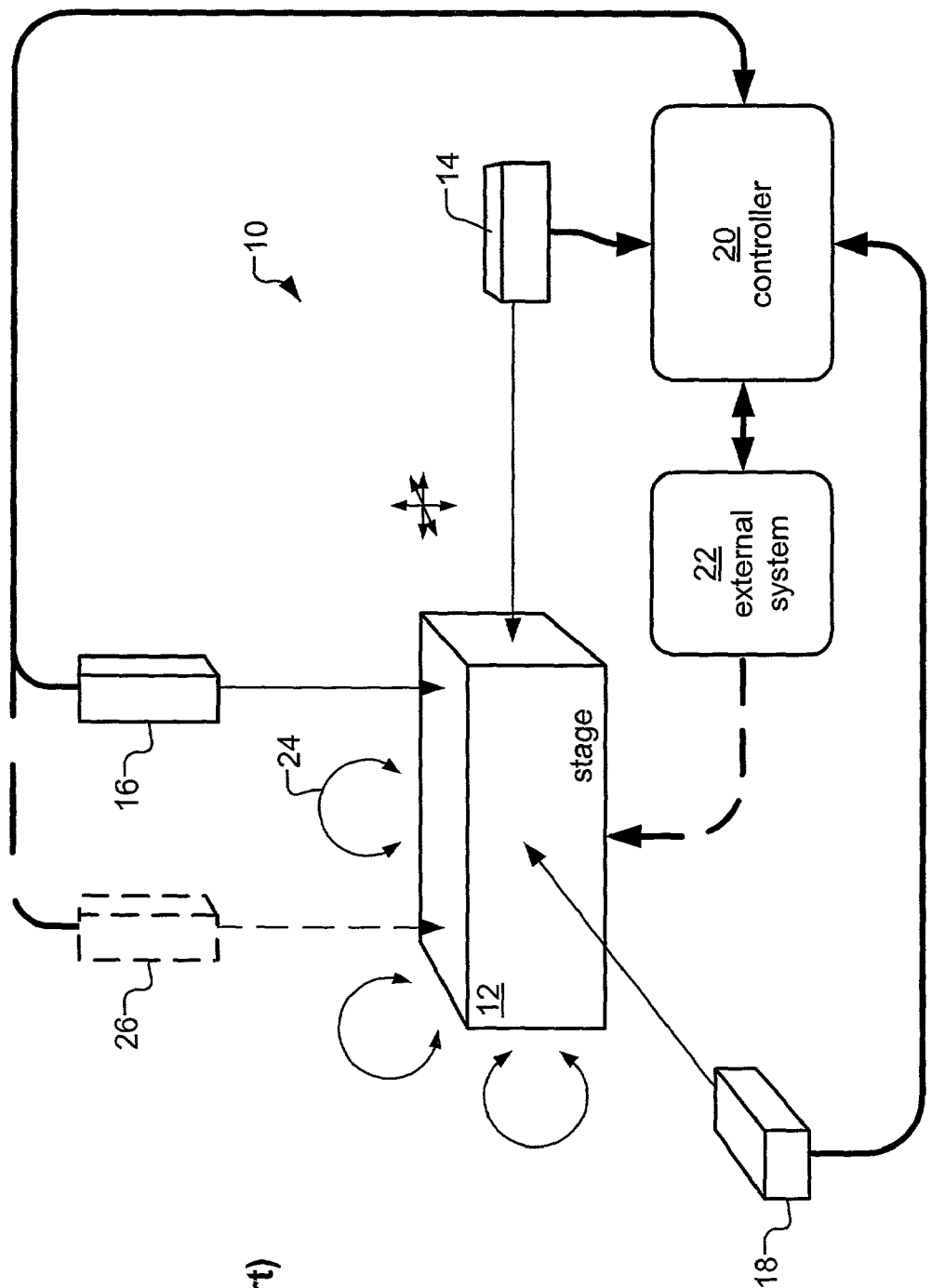
FIG. 1 (background art) is a perspective view of how a conventional laser interferometer measurement system is used to determine the position of a movement stage.

A preferred embodiment of the present invention is a position determining system (hereinafter "PDS"). As illustrated in the various drawings herein, and particularly in the views of FIGS. 2 and 5, the inventive device is depicted by the general reference character 100. Where appropriate, reference numbers are reused in the figures.

Figure 2:
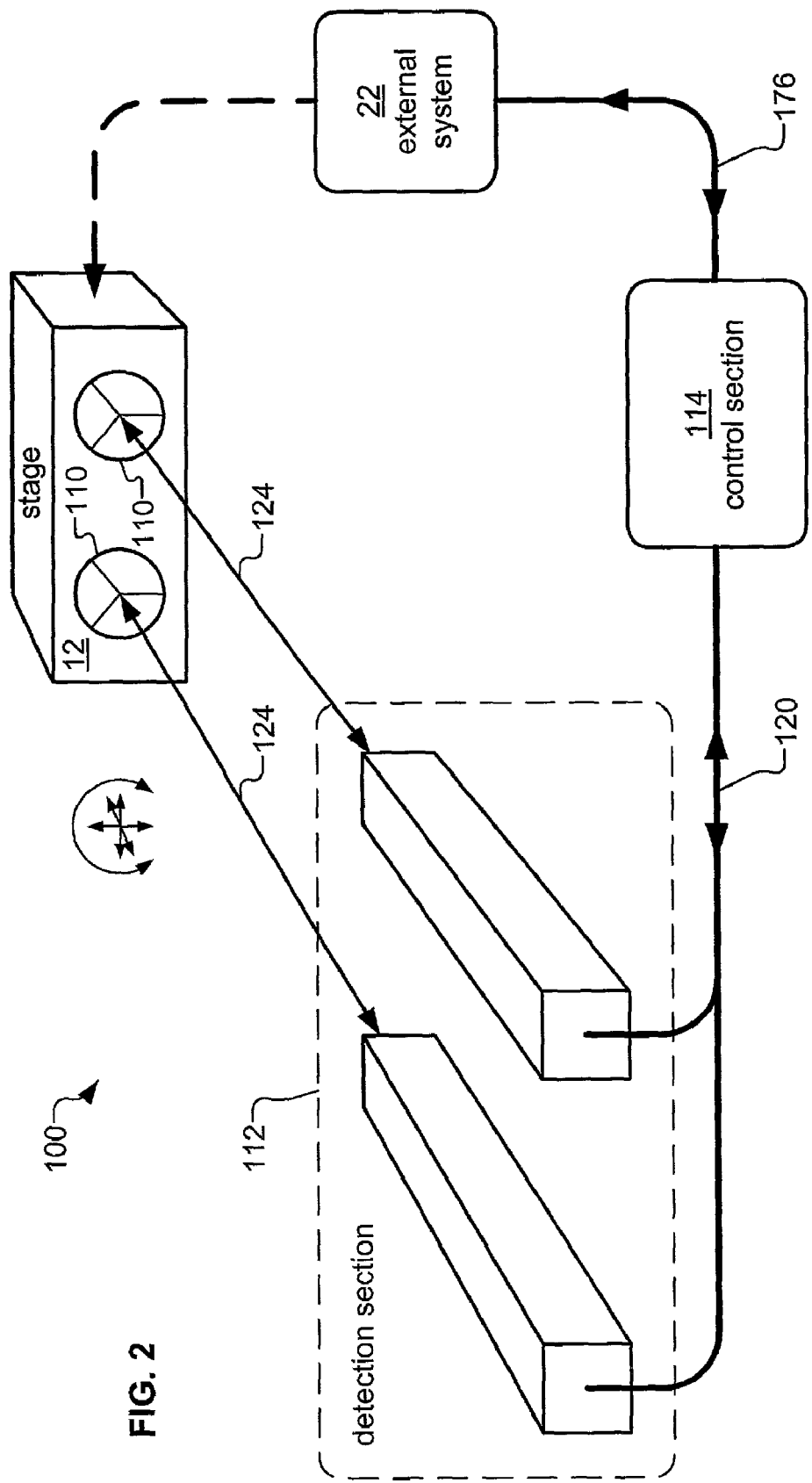
FIG. 2 is an perspective view of an embodiment of the present invention in use to determine positional information about a movement stage.

FIG. 2 depicts a preferred embodiment of the inventive PDS 100 in a generic usage scenario for determining positional information about a typical movement stage 12, such as that of FIG. 1 (background art). Retroreflective targets 110 are mounted on the movement stage 12; a detection section 112 is provided to optically sense information about the retroreflective targets 110; and a control section 114 is provided to control the operation of the PDS 100 and to communicate with an external system 22. The movement stage 12 and the external system 22 are not formally parts of the inventive PDS 100. As discussed with respect to FIG. 1 (background art) the movement stage 12 may by a simple stage of any type which one wants to know positional information about. Typically, but not necessarily in all applications, the external system 22 will control movement of the movement stage 12 using servo feedback techniques and also display or record positional information about the movement stage 12 at various points in a manufacturing or laboratory process.

Figure 3:
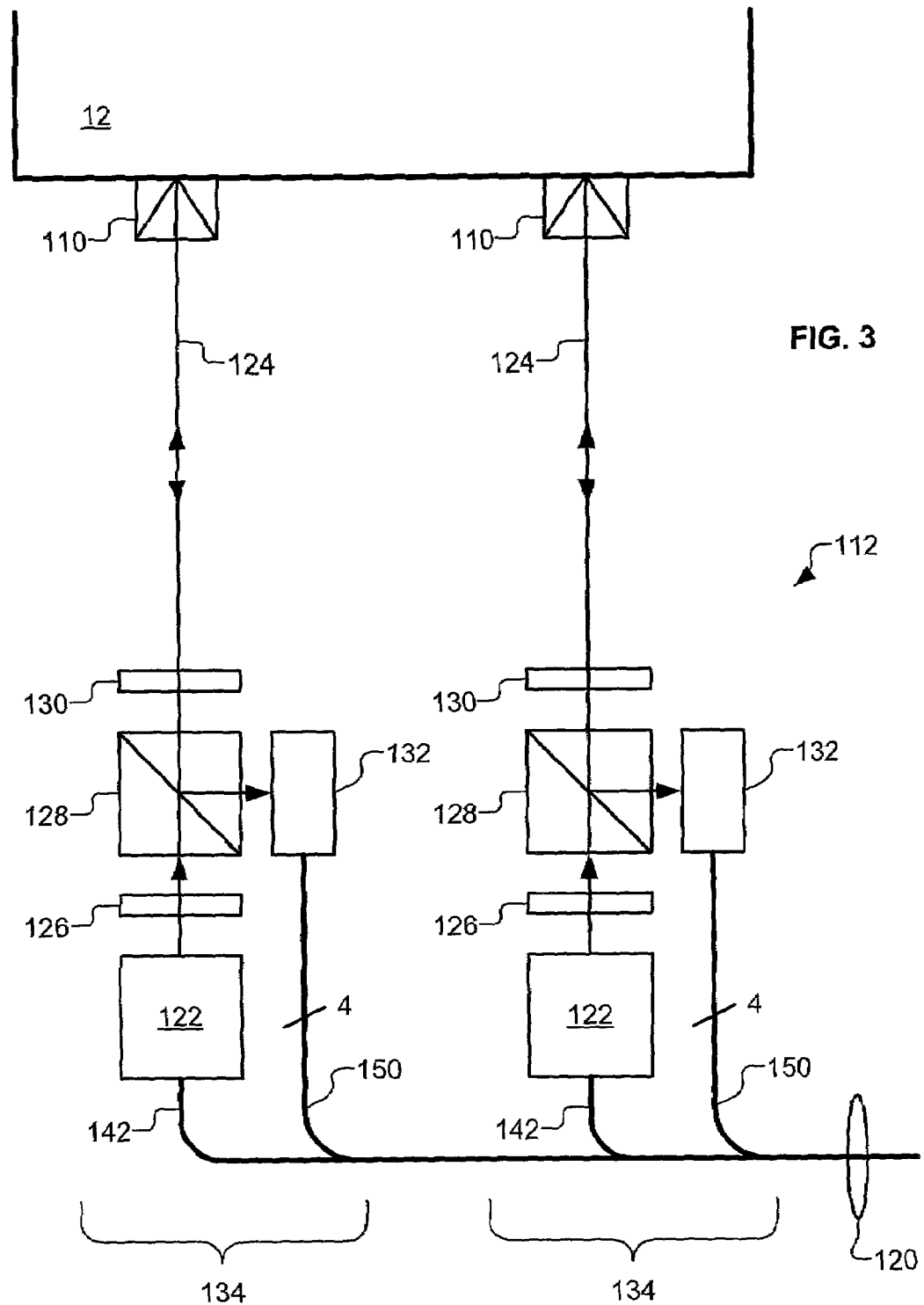
FIG. 3 is a block diagram in top plan view particularly showing the detection section of the embodiment of FIG. 2.

FIG. 3 is a top view particularly showing the components and functions of the detection section 112. Modulation is applied to one or more light sources 122, via a bus 120 connected to the control section 114. Details for the preferred form of modulation are discussed presently. Typically the light source 122 produces two light beams 124 (two light sources 122 are shown here). The inventor's preferred light source 122 includes a conventional laser diode.

Each light beam 124 is passed through a polarizing plate 126. This is desirable because many light sources, including laser diodes, do not produce light which is strongly polarized. The polarized light beams 124 then pass directly through respective polarized beam splitters 128, which have been suitably positioned and oriented to permit this. Each light beam 124 is next passed through a retardation plate 130 (e.g., a conventional ¼ wave plate), where the polarization of the light beam 124 is altered. The light beams 124 then exit the detection section 112, proper, and travel onward to and are reflected back by respective retroreflective targets 110 which are mounted on the movement stage 12.

The return paths of the light beams 124 are somewhat similar to those already taken, but not completely so. After reflection by the retroreflective targets 110, the light beams 124 re-enter the detection section 112, and each again passes through its respective retardation plate 130. The already once altered polarizations of the light beams 124 are accordingly further altered by this second passage. The light beams 124 then re-enter the polarized beam splitters 128. However, due to their now altered polarizations and the orientations of the polarized beam splitters 128, the light beams 124 are each now redirected into a respective sensor unit 132. The sensor units 132 each detect a respective returned light beam 124 and create information which is communicated to the control section 114 via the bus 120. The inventor's preferred sensor unit 132 includes a quad-cell photo detector.

As initially noted, two light beams 124 are typically produced. FIG. 3 thus can be viewed as depicting two optical channels 134. The use of two such optical channels 134 particularly permits the inventive PDS 100 to measure a number of positional characteristics, as will be described presently. Embodiments having as few as one and more than two optical channels 134 are also possible.

Figure 4:
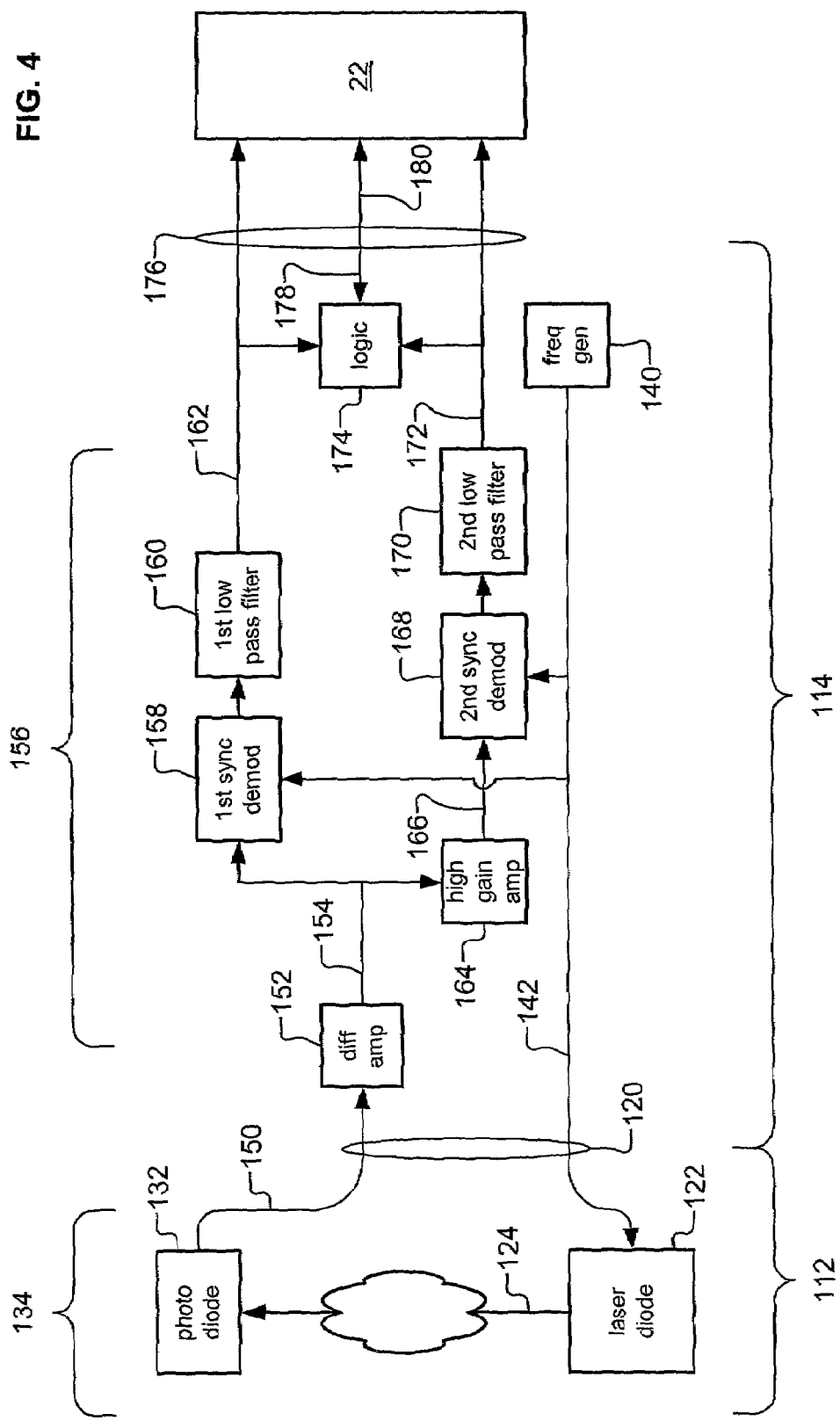
FIG. 4 is a block diagram functional representation of the control section.

FIG. 4 is a block diagram particularly showing the functional operation of the control section 114. A frequency generator 140 produces a modulation signal 142 which is communicated over the bus 120 to the light sources 122 in the detection section 112, where it is used to modulate each light beam 124 (FIG. 4 depicts only one of the optical channels 134 of the embodiment of FIG. 3).

Figure 5:
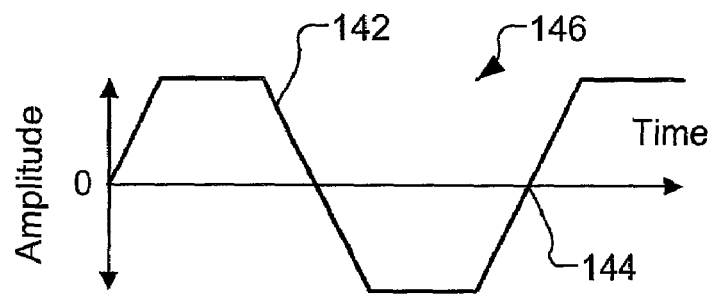
FIG. 5 is a graph depicting details of the preferred modulation signal provided by the control section.

FIG. 5 depicts details of the preferred modulation signal 142. The frequency of modulation is above 30 kHz, but this is merely a matter of design choice. In applications which the inventor currently has in development, using such a frequency helps to obtain appropriate slave servo bandwidth in the high speed external system 22. The waveform used preferably also has a linear transition 144 at zero crossing. This facilitates electronic signal processing, but also is not a necessity. A suitable shape for the modulation signal 142 thus might be the trapezoidal waveform 146 which is shown.

Figure 6:
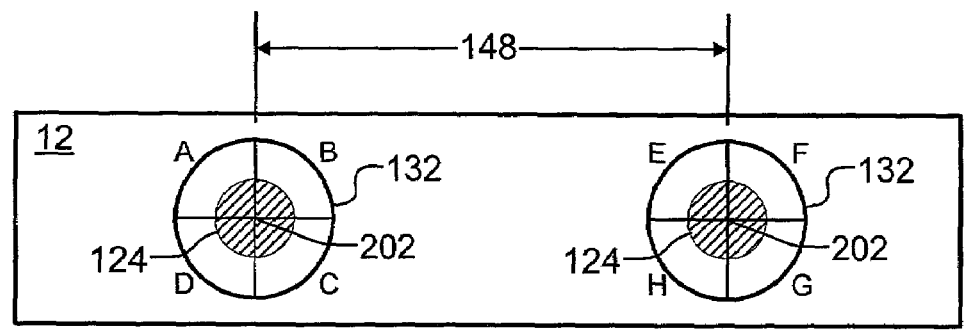
FIG. 6 is a side elevation view of the face of the movement stage illuminated in an optimal initial set-up manner by light beams from the detection section.

FIG. 6 depicts the faces of both of the sensor units 132 mounted on the movement stage 12 of FIG. 3 (or FIG. 8), being illuminated in their very centers by the light beams 124. This is an optimal initial set-up arrangement for the PDS 100 and the movement stage 12 since it provides for ranges of movement in many directions. As shown, when using quad-cell photo diodes for the sensor units 132, quadrants A, B, C and D are defined for the left sensor unit 132 and quadrants E, F, G and H are defined for the right sensor unit 132. The sensor units 132 thus each have a center point 202 where the quadrants meet and the respective light beams 124 have a center separation 148 (S), as shown. It is desirable, but not necessary (since compensation in the control section 114 can accommodate for some degree of offset), that the center points 202 of the sensor units 132 be spaced apart a distance equal to the center separation 148 of the light beams 124. Another way of envisioning all of this is to view the light beams 124 as having central axes (not shown in FIG. 6 but easily seen in the stylistically simplified light beams 124 of FIG. 3, for example), and appreciating that in an optimum set-up scenario each such central axis intersects the center point 202 of a sensor unit 132.

Figure 7:
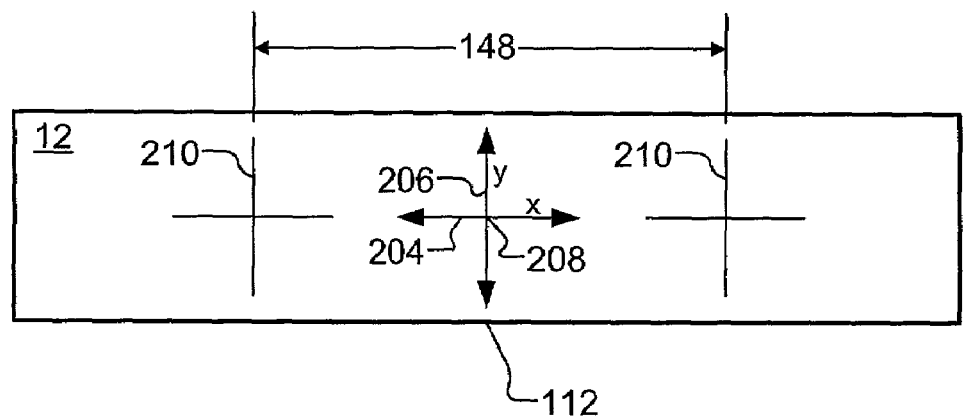
FIG. 7 is a side elevation view of the face of the movement stage particularly showing movement axes, light beam centers, and a light beam separation distance for the view of FIG. 6.

FIG. 7 shows how the movement stage 12 may have an x-axis 204 and a y-axis 206 defined with a common origin 208. For conceptual purposes it is useful to orient the intersections 210 of the quadrants of the sensor units 132 the same and parallel with the x-axis 204 and y-axis 206, but the underlying mathematical principles of the invention are not affected by this.

Returning now to FIG. 4, the sensor units 132 receive the light beams 124, in the manner previously described for FIG. 3, and each produces raw signals 150 which are communicated over the bus 120 back to the control section 114. For the quad-cell type sensor units 132 used here, each cell-quadrant produces a raw signal 150, and thus four are created for each optical channel 134 (i.e., eight for the embodiment of FIG. 3).

The sensor units 132 are typically direct current (DC) biased, and hence the raw signals 150 each have both DC and alternating current (AC) signal elements at this early stage. Unfortunately, the DC element is subject to thermal and other types of drift, which is a particular weakness of many present detectors. The effects of such drift must be eliminated before high gain amplification is used in later signal processing. To remove the undesirable DC elements, the raw signals 150 are fed into differential amplifiers 152 which couple only the AC elements and create quadrant A–B, B–C, C–D, and D–A difference signals 154.

Each difference signal 154 and the respective components used to further process it may collectively be viewed as an electrical channel 156. FIG. 4 depicts only one such electrical channel 156, but the embodiment of FIG. 2 might employ eight such channels or use multiplexing (not shown) to lower the electrical channel count. The inventive spirit of the PDS 100 encompasses such alternates.

Once the difference signals 154 have the undesirable DC elements removed there are usually still undesirable AC elements also present. For example, room lighting may introduce such undesirable AC elements. If incandescent lighting is used in a measurement area it may introduce 60 hertz AC signal elements, and if fluorescent lighting is used it may introduce various higher frequency AC signal elements. Eliminating such undesirable AC elements is of key importance, and the manner in which the inventor does this is new to the art of optical position measurement.

A sample of each difference signal 154 is processed by a first synchronous demodulator 158 and passed through a first low pass filter 160 to obtain a coarse position signal 162. Since the first synchronous demodulator 158 operates directly on the low gain difference signal 154, high precision demodulation is not required here, and conventional analog switches and operational amplifiers may be used.

Another sample from each difference signal 154 is amplified with a high gain amplifier 164 to produce a highly amplified signal 166. In the preferred embodiment, an operational amplifier configured as an inverting amplifier is used for the high gain amplifier 164, to provide a gain of 500 and to thereby obtain heightened sensitivity in the PDS 100. The highly amplified signal 166 is then processed by a second synchronous demodulator 168, and is passed through a second low pass filter 170 to obtain a fine position signal 172. The second synchronous demodulator 168 usually must be of high precision, due to the sensitive nature of the highly amplified signal 166.

In the preferred embodiment the second synchronous demodulator 168 and the second low pass filter 170 are combined in a board level, lock-in amplifier system which serves as a high quality balanced demodulator and a 6th order high quality filter. A suitable component for this is a "Lock-in Engine" which is commercially available from Quanta Physik, Inc. of Palm Beach Gardens, Fla., USA. ("The lock-in amplifier is basically a synchronous demodulator followed by a low pass filter . . . Lock-in amplification is a technique which is used to separate small, narrow band signal content from interfering noise. The lock-in amplifier acts as a detector and narrow band filter combined. Very small signals can be detected in the presence of large amounts of non-correlated noise when the frequency and phase of the desired signals are known." From AD630 Application Note by Analog Devices, Inc. of Norwood, Mass. Quanta Physik's Lock-in Engine is built around the AD630 component.)

The coarse position signal 162 and the fine position signal 172 are provided to a logic unit 174, and optionally also directly to the external system 22. The logic unit 174 will typically include powerful microprocessor capabilities which will depend considerably on the capabilities of the external system 22 and the needs of the application in which the PDS 100 is used.

A communications link 176 is provided between the logic unit 174 and the external system 22. This communications link 176 may be bi-directional, permitting the external system 22 to transmit instruction signals 178 to the logic unit 174 for when to operate the PDS 100 and obtain the coarse position signal 162 and fine position signal 172, and also permitting the PDS 100 to transmit processed position data in a result signal 180 back to the external system 22.

Figure 8:
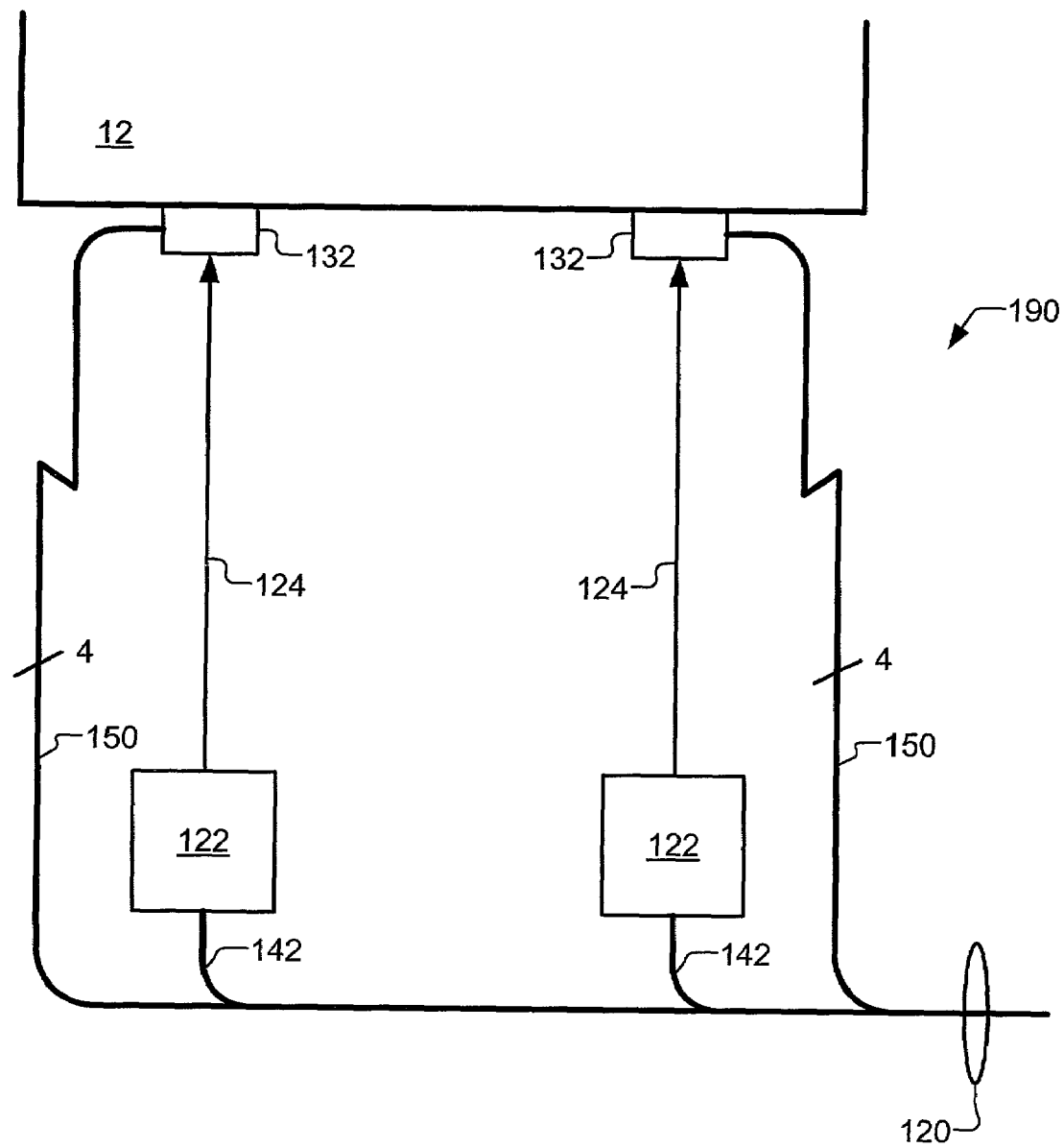
FIG. 8 is a block diagram in top plan view depicting an alternate preferred embodiment of the invention.

FIG. 8 depicts an alternate preferred embodiment of the inventive PDS 100. Here, the sensor units 132 are instead directly mounted on the movement stage 12, in place of the retroreflective targets 110 of FIG. 2, and a targeting section 190 optically "targets" the remote sensor units 132. The same control section 114 as previously described can also control the operation of the PDS 100 and communicate with the external system 22 in this embodiment.

The targeting section 190 used here may be much simpler optically than the detection section 112 of FIGS. 2 and 3. A light source 122 again is present and used to provide light beams 124 which are modulated with the modulation signal 142 from the control section 114. A major change, however, is that no polarization related components are needed. The sensor units 132 which are mounted directly on the movement stage 12 are illuminated directly by the light beams 124, without using reflection and any intervening optical components between them and the light sources 122. The sensor units 132 may work essentially the same as previously discussed for FIG. 2–4, producing the same raw signals 150.

While optically much simpler, this alternate embodiment may sometimes be more complex mechanically and electronically, and accordingly more troublesome to employ. For example, if the separation between the light sources 122 and the sensor units 132 is great, the electrical cable used to carry the raw signals 150 may be easily abused and damaged. Also, the raw signals 150 may be unduly attenuated or corrupted by electrical noise when traveling long distances.

FIG. 9a–e depict side elevation views of the face of the movement stage 12 of FIG. 8. Further, as those skilled in the optical arts will appreciate, the conceptual principle in the following discussion applies to the faces of the sensor units 132 in the embodiment of FIG. 2–3 as well. The faces of the sensor units 132 are depicted here as having quadrants A–D and E–H illuminated by the light beams 124.

Figure 9A:
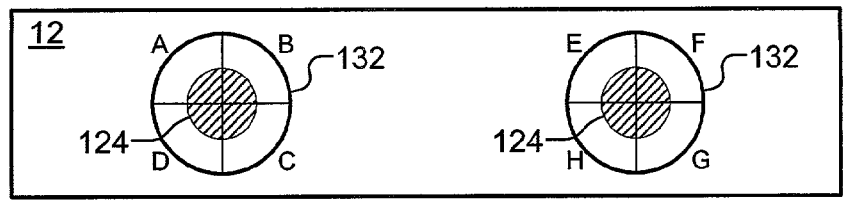

FIG. 9a is essentially the same as FIG. 7. It shows an optimal initial placement of the movement stage 12 relative to the detection section 112 or the targeting section 190. The faces of both sensor units 132 are illuminated in their very centers by the light beams 124. Quadrants A, B, C and D on the left sensor unit 132 and quadrants E, F, G and H on the right sensor unit 132 are all receiving equal illumination, and the raw signals 150 going to the control section 114 will indicate this. The respective light beams 124 have a center separation 148 (S), as shown.

Figure 9B:
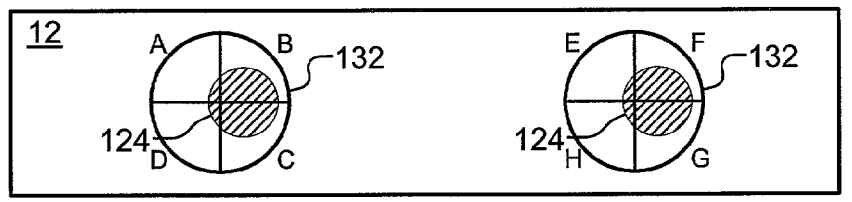

FIG. 9b shows the movement stage 12 displaced laterally to the left, i.e. horizontally, from where it was in FIG. 9a. The direction of movement is thus perpendicular to the propagation direction of the light beams 124. The illumination on the quadrants here has changed, and the raw signals 150 going to the control section 114 will now indicate this. Suitable processing in the control section 114 will therefore be able to determine if and to what extent such movement has occurred. This permits the PDS 100 to perform horizontal straightness measurement.

Figure 9C:
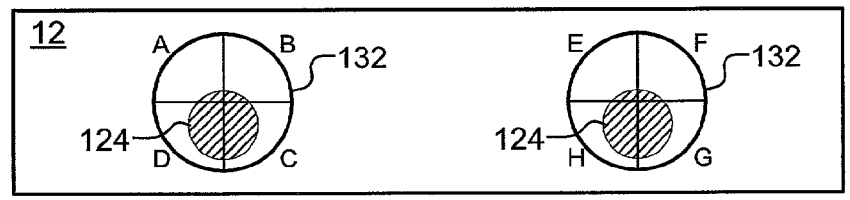

FIG. 9c shows the movement stage 12 displaced laterally upward, i.e. vertically, from where it was in FIG. 9a. The direction of movement is again perpendicular, but differently so, with respect to the light beams 124. The illumination on the quadrants has also changed here, as the raw signals 150 will again indicate. Suitable processing in the control section 114 is also able to determine if and to what extent this movement has occurred. This permits the PDS 100 to perform vertical straightness measurement.

Figure 9D:
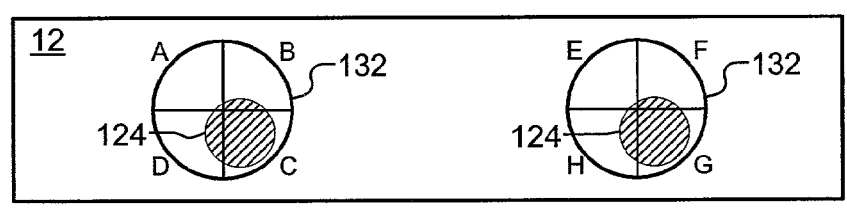

FIG. 9d is a more complex case. It shows the movement stage 12 displaced diagonally upward and to the left, i.e. both horizontally and vertically, from where it was in FIG. 9a. However, this is also well handled by the inventive PDS 100.

Figure 9E:
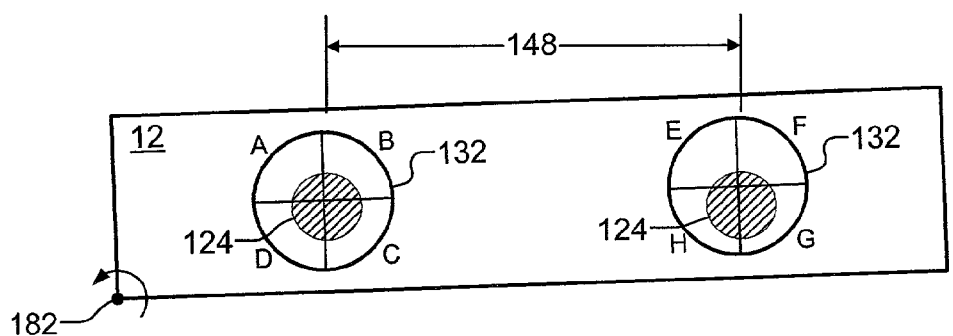

FIG. 9e is a still more complex case. It shows the movement stage 12 rotated about an axis 182 (which is perpendicular to the plane of the figure and therefore depicted accordingly). In discussing FIG. 1 (background art), this type of tilt or rotational movement was identified as "roll." The PDS 100 can perform roll measurement by using appropriate processing in the control section 114 of the raw signals 150 which occur here.

The underlying principles of how the inventive PDS 100 can perform the above and other forms of translation and roll measurement are as follows. When the light beams 124 illuminate the sensor units 132 they produce a current or voltage (depending on the type of sensor used) which is proportional to the strength of the light present. As was discussed above, the raw signals 150 are processed to eliminate undesirable elements not attributable to the light beams 124, e.g., drift, interference from room lighting, etc.

In the preferred embodiment, the photo detector components used in the sensor units 132 each produces a current (I) for each quadrant which is proportional to the illumination received. Thus, the illumination from the left light beam 124 on the left sensor unit 132 is defined by the equation $I_l = I_A + I_B + I_C + I_D$. Similarly, the illumination from the right light beam 124 on the right sensor unit 132 is defined by the equation $I_r = I_E + I_F + I_G + I_H$.

The movement of the movement stage 12 depicted in FIG. 9b and 9c, i.e., strictly horizontal or vertical translation, may be found using the simple equations:

$$\Delta X = I_A - I_B = I_D - I_C = I_E - I_F = I_H - I_G;$$

$$\Delta Y = I_A - I_D = I_B - I_C = I_E - I_H = I_F - I_G.$$

From these it can be seen that if one is only concerned about a strictly horizontal or a strictly vertical translation, one can even dispense with using quad-cell components and simply use appropriately oriented bi-cells in the sensor units 132.

For horizontal and vertical translation in combination, such as the situation depicted in FIG. 9d, the equations above will not work. For strictly horizontal and vertical translation together one may instead use:

$$\Delta X = (I_A + I_D) - (I_B + I_C) = (I_E + I_H) - (I_F + I_G);$$

$$\Delta Y = (I_A + I_B) - (I_C + I_D) = (I_E + I_F) - (I_G + I_H).$$

However, even these equations are not accurate if roll occurs. For ignoring roll and detecting just the horizontal and vertical translations one may use:

$\Delta X$=the lesser of either $(I_A+I_D)-(I_B+I_C)$ or $(I_E+I_H)-(I_F+I_G)$;

$\Delta Y$=the lesser of either $(I_A+I_B)-(I_C+I_D)$ or $(I_E+I_F)-(I_G+I_H)$.

And for determining the amount of roll (lets call this "θ") of the movement stage 12 one may use the equation (recalling that S=the center separation 148 of the light beams 124):

$$\Delta \theta = (((I_A+I_D)-(I_B+I_C))-((I_E+I_H)-(I_F+I_G)))/S.$$

Returning now primarily to FIG. 3, several changes can be made in the embodiment depicted there without departing from the spirit of the present invention. For example, the multiple light sources 122 and polarizing plates 126 might be replaced with single instances of each, and beam splitting and bending instead used to produce the desired number of light beams 124. The inventor prefers the depicted version because laser diodes and polarizing plates are relatively inexpensive and easy to work with. In contrast, beam splitters and benders having the requisite quality, such as partially reflective cubes and mirrors, are expensive and add to optical component alignment difficulties.

Another example would be to exchange the positions of the light sources 122 and polarizing plates 126 with those of the sensor units 132, and to suitably orient the polarized beam splitters 128 for working with this arrangement instead. Under this variation, the light beams 124 would initially be reflected by the polarized beam splitters 128, and then later pass directly through them when returning from the retroreflective targets 110.

Returning to FIG. 2–3 and FIG. 8, the embodiment of FIG. 2–3 is particularly suitable for movement stages which are distant from the detection section 112, or which move at high enough speeds that routing the bus 120 to it is undesirable. In contrast, the embodiment of FIG. 8 is simpler and cheaper. But, yet other embodiments are also possible, and are encompassed within the spirit of the inventive PDS 100. For example, a hybrid approach would be to angularly reflect the light beams off of reflectors mounted on the movement stage and onto sensor units mounted elsewhere off of the movement stage. This would provide the optical economy of the FIG. 8 embodiment and the tether-less cable advantage of the FIG. 2–3 embodiment, but at the expense of aligning and maintaining the angular light beam reflection paths.

Figure 10:
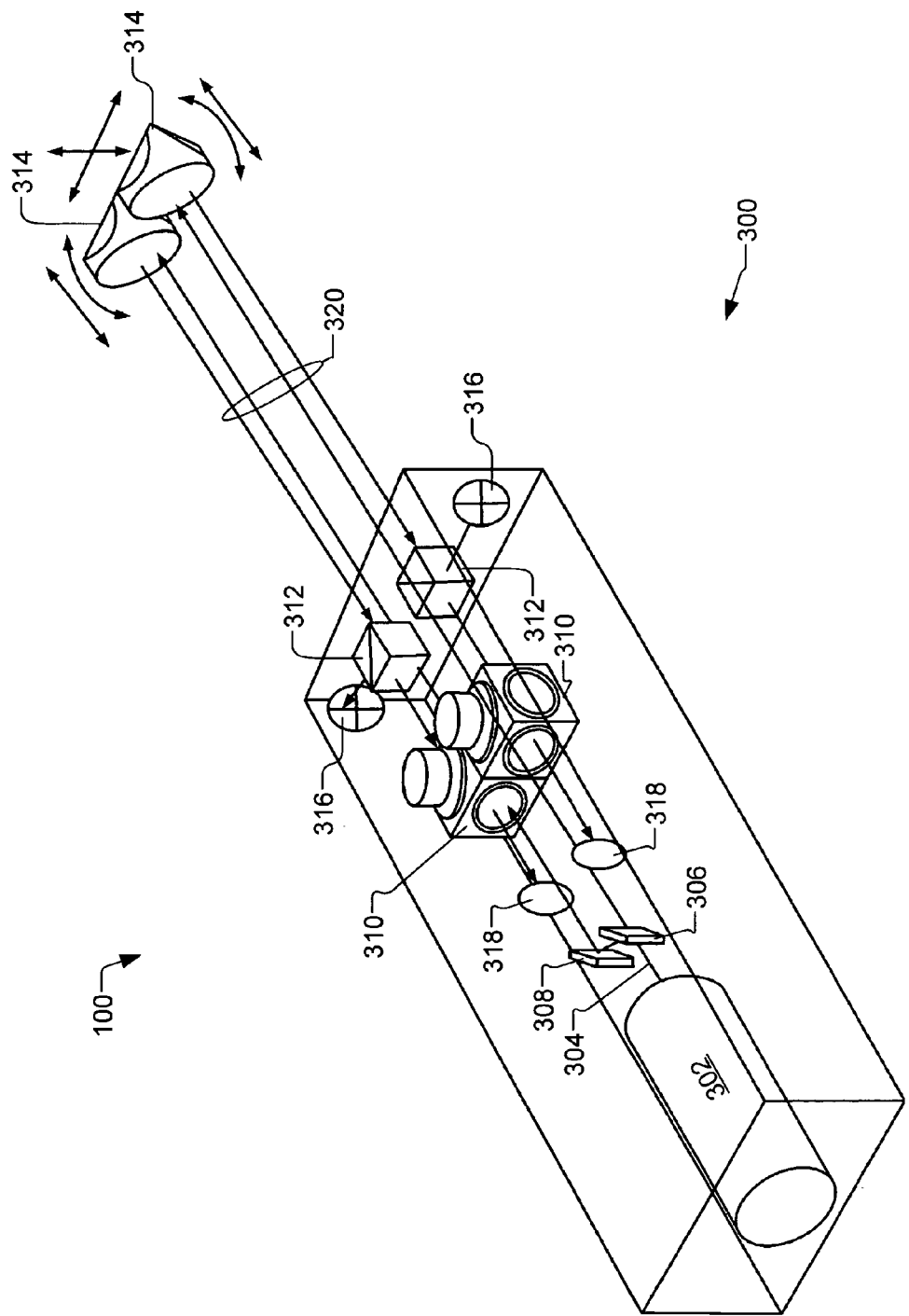
FIG. 10 is a perspective view depicting a sophisticated embodiment of the invention forming a multiple parameters measurement system.

FIG. 10 is a perspective view depicting a more sophisticated embodiment of the inventive PDS 100, one which the inventor terms a "multiple parameters measurement system" (MPMS 300). The MPMS 300 includes a single laser light source 302 to provide a light beam 304, that is split by a splitter 306 into two parts, one of which is then directed parallel with the other by a beam bender 308. This permits the one light source 302 to serve two optical channels. Each channel includes a linear interferometer 310, a beam splitter 312, retroreflector 314 (mounted on a measurement target, not shown), a detector 316, and a receiver 318. Polarization may or may not be used, in the manner already described for the embodiment in FIG. 3. The detectors 316 are "position sensitive detectors," and may be photodiode devices such as those described for the sensor units 132 (FIGS. 3 and 8)(e.g., bi-cell or quad-cell units, diode arrays etc.). In contrast, while photodiode devices may also be used in the receivers 318 the function there is to detect a beat frequency rather than detection. Accordingly, these preferably are precision single cell units.

Operationally, in each channel, the light beam 304 enters the linear interferometer 310, where it is split into a reference beam and a measurement beam 320. The measurement beam 320 then passes through the beam splitter 312 and travels to and is reflected by the retroreflector 314 back to the beam splitter 312. This time however, the measurement beam 320 is split at the beam splitter 312 into a first beam portion which travels to the detector 316 and a second beam portion which enters the linear interferometer 310. In the linear interferometer 310 this second beam portion and the reference beam combine, interference occurs in the characteristic manner when waves combine, and the resulting beam travels on to the receiver 318 as shown.

When the retroreflector 314 undergoes lateral movement (due to rotational or translational change) the illumination of the first beam portion of the measurement beam 320 on the detectors 316 changes, and this is measurable with the respective detector 316.

When the retroreflector 314 undergoes displacing movement (due to linear displacement or yaw) a Doppler shift occurs which is proportional to the speed of this movement. The frequency of the reference beam, however, has remained constant while the frequency of the second beam, portion of the measurement beam 320 has changed. The interference accordingly changes, and the receiver 318 senses this change. With suitable frequency counting and accumulation in a control section (not shown here; see e.g., FIG. 2) the longitudinal displacement of the retroreflector 314 can thus be determined.

Of course, this occurs in both optical channels concurrently. Therefore, linear displacement can be calculated as the longitudinal displacement of one retroreflector 314 plus the longitudinal displacement of the other retroreflector 314, divided by two. Yaw can be calculated as the longitudinal displacement of one retroreflector 314 minus the longitudinal displacement of the other retroreflector 314, divided by two. Horizontal straightness movement can be calculated as the horizontal position reading of one detector 316 plus the horizontal position reading of the other detector 316, divided by two. Vertical straightness movement can be calculated as the vertical position reading of one detector 316 plus the vertical position reading of the other detector 316, divided by two. Roll can be calculated as the arctangent of the difference in the vertical position readings divided by the difference in the horizontal position readings.

In sum, the MPMS 300 can measure movement of an object with five degrees of freedom. Only measuring pitch proves difficult, but in straightforward manner one or more optical channels can be added and it can be measured as well.

The MPMS 300 can, optionally, use modulation of the light beam 304 and phase sensitive detection, if accuracy necessitates that. However, in many cases that can be dispensed with, since performing 5-degree measurement with a single "station" comprising one MPMS 300 is useful in many measurement scenarios in its own right.

In addition to the above mentioned examples, various other modifications and alterations of the inventive PDS 100 may be made without departing from the invention. Accordingly, the above disclosure is not to be considered as limiting and the appended claims are to be interpreted as encompassing the true spirit and the entire scope of the invention.

INDUSTRIAL APPLICABILITY

The present position determining system ("PDS 100") and the multiple parameters measurement system (MPMS 300) are well suited for application in detecting positional characteristics of fixed and moving measurement targets. In many industrial processes measurement stages 12 are suitable as such measurement targets, and thus these industrial process may benefit by use of the inventive PDS 100 or MPMS 300. Example industries where particular present need exists include semiconductor device fabrication and disk storage unit assembly. The invention provides measurement accuracy and speed which are desired in these industries, as well as many others.

The PDS 100 and MPMS 300 may also be highly desirable for some types of measurement due to the non-contact nature of its optical principles. Use of the invention can thus avoid undesirable interference with an underlying manufacturing process. Suitable embodiments of the PDS 100 and MPMS 300 may also overcome the range limitations of some common electrical measurement systems. Measurement systems using transducers such as LVDT and capacitive sensors have notoriously short measurement ranges, and considerable loss of reliability as the extremes of their ranges are approached. Whereas such electrical systems are typically useful only at ranges of less than one meter, optical systems, including the PDS 100, may be used at ranges up to many kilometers.

The PDS 100 and MPMS 300 are also economical. It is relatively inexpensive to construct and it is often cheaper to operate than many existing measurement systems. This is particularly notable in contrast to particular present measurement systems used in roles which the inventive PDS 100 and MPMS 300 may now fill. For example, laser interferometer systems are notoriously expensive, and the unreliability of electrical systems, alluded to above, can be quite uneconomical if manufacturing tool breakage or material scrapage occurs as a result.

As has already been described here, the PDS 100 and MPMS 300 may be constructed of relatively common and available electro-optical components such as laser diodes and photo diodes; optical components such as polarizers, beamsplitters, quarter-wave plates, and retroreflectors; and electronic components such as amplifiers, filters, and microprocessors. In view of these and other characteristics, successful and rapid construction of various embodiments of the inventive PDS 100 and MPMS 300 should be well within the capabilities of skilled practitioners of the relevant arts once the principles taught herein are appreciated.

For the above and other reasons, it is expected that the PDS 100 and MPMS 300 of the present invention will have widespread industrial applicability and it is expected that the commercial utility of the present invention will be extensive and long lasting.

What is claimed is:

1. A measuring apparatus, comprising:
 a light source for producing light beams for at least two optical channels, wherein said light source includes a modulator to produce said light beams including a modulation characteristic;
 said optical channels each including:
  an interferometer for receiving one said light beam and providing therefrom a reference beam and a measurement beam;
  a reflective target for receiving and redirecting said measurement beam;
  a beam splitter for receiving the redirected said measurement beam and providing therefrom a first portion and a second portion;
  a detector for sensing said first portion and producing a detector signal based thereon;
  said interferometer further for receiving said second portion of said measurement beam and combining said second portion with said reference beam to form a result beam; and
  a receiver for sensing said result beam and producing a receiver signal based thereon; and
 a processing system for processing said detector signals and said receiver signals into position data suitable for communication to an external system, wherein said processing system includes a demodulator to process at least one of said detector signals and said receiver signals with phase sensitive detection.

2. The measuring apparatus of claim 1, wherein said light source includes a laser diode.

3. The measuring apparatus of claim 1, wherein said light source includes a single light producing unit, a splitter and a bender for producing said light beams.

4. The measuring apparatus of claim 1, wherein said light source includes a plurality of light producing units, one per each said optical channel.

5. The measuring apparatus of claim 1, wherein said interferometers and said beam splitters employ polarization.

6. The measuring apparatus of claim 1, wherein said reflective targets are retroreflectors.

7. The measuring apparatus of claim 1, wherein said detectors are position sensitive detectors.

8. The measuring apparatus of claim 1, wherein said detectors include at least one member of the set consisting of bi-cell photo diode units, quad-cell photo diode units, and photo diode arrays.

9. The measuring apparatus of claim 1, wherein said receivers include photo diodes.

10. A measuring apparatus, comprising:
 means for producing light beams for at least two optical channels, wherein said means for producing light beams includes means for modulating to produce said light beams including a modulation characteristic;
 said optical channels each including:
 interferometer means for receiving one said light beam and providing therefrom a reference beam and a measurement beam;
 means for receiving and redirecting said measurement beam;
 splitter means for receiving the redirected said measurement beam and providing therefrom a first portion and a second portion;
 detector means for sensing said first portion and producing a detector signal based thereon;

said interferometer means further for receiving said second portion of said measurement beam and combining said second portion with said reference beam to form a result beam; and receiver means for sensing said result beam and producing a receiver signal based thereon; and processing means for processing said detector signals and said receiver signals into position data suitable for communication to an external system, wherein said processing means includes demodulating means to permit processing at least one of said detector signals and said receiver signals with phase sensitive detection.

11. The measuring apparatus of claim 10, wherein:

said means for producing light beams includes:

means for producing an initial beam;

means for splitting said initial beam into a first beam and at least one secondary beam; and bender means for directing said secondary beams in parallel with said first beam, thereby producing said light beams for said at least two optical channels.

12. The measuring apparatus of claim 10, wherein:

said interferometers include means for polarizing said measurement beams; and said splitter means includes means for separating with polarization, thereby permitting providing said first portions and said second portions of said measurement beams based on respective polarization characteristics.

13. A method for measuring positional information about a target, the method comprising the steps of:

(a) producing light beams for at least two optical channels, including modulating said light beams with a frequency; and in each said optical channel:

(b) receiving a said light beam and providing therefrom a reference beam and a measurement beam;

(c) receiving at and redirecting said measurement beam from the target;

(d) receiving the redirected said measurement beam and providing therefrom a first portion and a second portion;

(e) producing a detector signal based on said first portion;

(f) combining said second portion with said reference beam to form a result beam;

(g) producing a receiver signal based on said result beam; and (h) processing said detector signals and said receiver signals into position data suitable for communication to an external system, including demodulating at least one of said detector signals and said receiver signals based on said frequency and applying phase sensitive detection.

14. The method of claim 13, wherein:

said step (b) includes polarizing said measurement beams; and said step (d) includes separating said first portions from said second portions based on polarization.

* * * * *